US010408970B2

(12) United States Patent
Villien

(10) Patent No.: US 10,408,970 B2
(45) Date of Patent: Sep. 10, 2019

(54) METHOD FOR LOCATING A DEVICE WHICH IS MOVED IN A THREE-DIMENSIONAL SPACE

(71) Applicants: MOVEA, Grenoble (FR); Commissariat á l'énergie atomique et aux énergies alternatives, Paris (FR)

(72) Inventor: Christophe Villien, Seyssinet-Pariset (FR)

(73) Assignees: MOVEA, Grenoble (FR); Commissariat à l'énergie atomique et aux énergies alternatives, Paris (FR)

( * ) Notice: Subject to any disclaimer, the term of this patent is extended or adjusted under 35 U.S.C. 154(b) by 305 days.

(21) Appl. No.: 14/741,818

(22) Filed: Jun. 17, 2015

(65) Prior Publication Data

US 2015/0369958 A1 Dec. 24, 2015

(30) Foreign Application Priority Data

Jun. 18, 2014 (FR) ...................................... 1455575

(51) Int. Cl.
*G01C 21/16* (2006.01)
*G01C 21/20* (2006.01)
(Continued)

(52) U.S. Cl.
CPC ............... *G01V 9/00* (2013.01); *G01B 21/16* (2013.01); *G01C 21/16* (2013.01); *G01C 21/206* (2013.01)

(58) Field of Classification Search
CPC ...... G01B 21/16; G01C 21/16; G01C 21/206; G01V 9/00
(Continued)

(56) References Cited

U.S. PATENT DOCUMENTS 8,548,738 B1 10/2013 Kadous et al.
2005/0130677 A1* 6/2005 Meunier ................ G01S 5/021 455/456.6
(Continued)

FOREIGN PATENT DOCUMENTS

| | | |
|---|---|---|
| EP | 2519803 B1 | 1/2014 |
| WO | WO2012009328 | 1/2012 |
| WO | WO2012/158441 | 11/2012 |

OTHER PUBLICATIONS

Arulampalam et al. "A Tutorial on Particle Filters for Online Nonlinear/ Non-Gaussian Bayesian Tracking," IEEE Trans Sign Proc, 2002,vol. 50, pp. 174-186.
(Continued)

*Primary Examiner* — Duy T Nguyen
(74) *Attorney, Agent, or Firm* — Occhiuti & Rohlicek LLP

(57) ABSTRACT

A method of location of a device includes a displacement law containing a corrective factor of a bias combined by an arithmetical operation with a measured variable, and particles, each particle being associated with a current value of the corrective factor. The current value of the corrective factor being constructed at each iteration on the basis of a previous current value of the corrective factor, computed during a previous iteration, to which is added a random variable drawn according to a predefined probability law. The current values of various particles are initialized, before the first iteration, to various initial values, and during each iteration, for each particle whose coordinates are updated with the aid of this displacement law, the value of the corrective factor in the displacement law is taken equal to this corrective factor's current value associated with the particle.

11 Claims, 1 Drawing Sheet

(51) Int. Cl.
*G01B 21/16* (2006.01)
*G01V 9/00* (2006.01)

(58) Field of Classification Search
USPC .......................................................... 702/152
See application file for complete search history.

(56) References Cited

U.S. PATENT DOCUMENTS

2009/0043504 A1* 2/2009 Bandyopadhyay .... G01C 17/38 701/469
2009/0201149 A1* 8/2009 Kaji ....................... G01C 21/20 340/539.13
2011/0211563 A1* 9/2011 Herrala ................. H04W 4/029 370/338
2012/0283855 A1* 11/2012 Hoffman ................ G01C 21/20 700/91
2012/0290254 A1* 11/2012 Thrun .................... G01C 21/16 702/150
2013/0245991 A1* 9/2013 Kriss ...................... G06Q 50/28 702/150
2013/0297204 A1* 11/2013 Bartels ................. G01C 21/165 701/495
2014/0149069 A1 5/2014 Kelly et al.
2014/0350847 A1* 11/2014 Ichinokawa ........... G01C 21/00 701/468

OTHER PUBLICATIONS

Krach et al. “Cascaded Estimation Architecture for Integration of Foot-Mounted Inertial Sensors,” In the Proceedings of the 2008 IEEE/ION Position Location and Navigation Symposium, Monterey, CA, USA, May 5-8, 2008, pp. 112-119.

Schmitz et al., “Combination of Map-Supported Particle Filters with Activity Recognition for Blind Navigation,” ICCHP (2), 2012, vol. 7383 of Lecture Notes in Computer Science , pp. 529-535.

Straub. “Bachelor Thesis: Pedestrian Indoor Localization and Tracking using a Particle Filter combined with a learning Accessibility Map,” Executed at the Institute for Real-Time Computer Systems, München, DE (Submitted Aug. 2010).

Woodman et al. “Pedestrian Localisation for Indoor Environments,” In the Proceedings of the 10th International Conference on Ubiquitous Computing, 2008, ACM: New York, pp. 114-123.

* cited by examiner

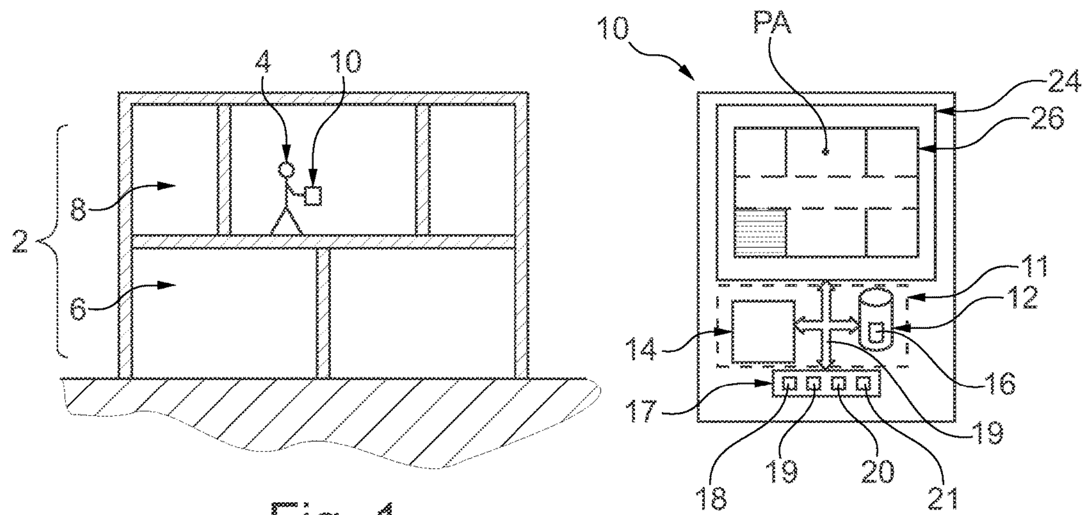
Fig. 1
Fig. 2
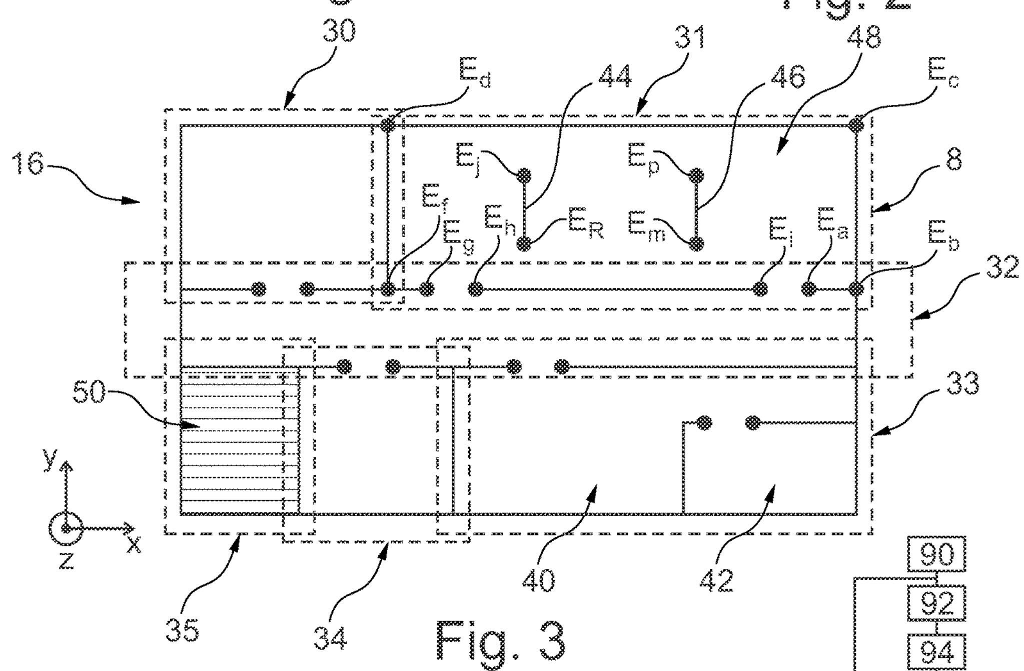
Fig. 3
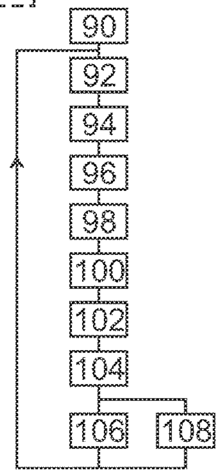
Fig. 4

METHOD FOR LOCATING A DEVICE WHICH IS MOVED IN A THREE-DIMENSIONAL SPACE

RELATED APPLICATIONS

Under 35 USC 119, this application claims the benefit of the Jun. 18, 2014 priority date of French Application FR 1455575, the content of which is herein incorporated by reference in its entirety.

FIELD OF INVENTION

The invention relates to a method of location of a device which is displaced inside a three-dimensional space. The subject of the invention is also an information recording medium, an electronic unit and a device for the implementation of this method.

BACKGROUND

Such methods are particularly useful when a method of location of the device by GPS ("Global Positioning System") is not possible. This is for example often the case inside buildings.

Known methods of location use the measurements of an inertial platform housed inside the device itself to measure its direction of displacement and the amplitude of its displacement in this direction from a previous position. Among these known methods, some use particle filters to estimate the position of the device in the three-dimensional environment. Accordingly, particle filters exploit the fact that there exist predefined constraints on the displacements of the device inside the three-dimensional environment. For example, a typical constraint is that a displacement cannot pass through a wall.

Thus, these known methods of location typically comprise:

a) the provision of a map of the three-dimensional space and of predefined constraints on the displacements of the device in this three-dimensional space, b) the generation, by an electronic computer, of several distinct particles, each particle being associated:

- with coordinates coding its position on the map, and
- with a weight representing the probability that the device is situated at the site of this particle, c) the reception of measurements representative of the direction of displacement of the device and of the amplitude of this displacement from its previous position, these measurements being carried out by sensors onboard the displaced device, d) the updating of the coordinates of the position of each particle as a function of the measurements received during step c) and of a predetermined displacement law for displacing this particle from its previous position $P^i_{k-1}$ to a new position $P^i_k$ in a manner correlated with the measured displacement of the device, each displacement law comprising for this purpose at least one first measured variable whose value is dependent on the measurement of the direction of displacement received during step c) and a second measured variable whose value is dependent on the measurement of the amplitude of this displacement received during step c), and then e) for each particle, if the latest displacement of this particle from the position $P^i_{k-i}$ to the position $P^i_k$ satisfies the predefined constraints, the increasing of the weight associated with this particle with respect to the weights of the particles whose latest displacement infringes these predefined constraints, the repetition of steps c) to e), and f) the estimation of the position of the device on the basis of the positions of the particles and of the weights associated with these particles by allotting, during this estimation, more importance to the positions of the particles associated with the highest weights.

Such known methods of location of a device implementing a particle filter are for example disclosed in:

- patent applications WO 2012158441 and U.S. Pat. No. 8,548,738 B1,
- in the article O. Woodman et al., "Pedestrian localization for indoor environments", ACM, 2008.

Such a method is also disclosed in detail in the thesis of J. Straub,

"Pedestrian indoor localization and tracking using a particle filter combined with a learning accessibility map", thesis, August 2010, Technical University of Munich. This thesis is downloadable at the following address: http://people.csail.mit.edu/jstraub/download/Straub10PedestrianLocalization.pdf.

Subsequently, this thesis is referenced through the term "Straub 2010".

Prior art is also known from:

EP2519803A, and

Krach B. et al., "Cascaded estimation architecture for integration of foot-mounted inertial sensors", Position, location and navigation symposium, 2008, IEEE/ION, Piscataway, 2008 May 5.

Under ideal conditions, these known methods make it possible to precisely estimate the position of the device. However, in reality, there may exist a constant bias in the direction of displacement of the device and/or in the amplitude of displacement of this device in this direction. This bias may have very different origins. For example, it may be caused by a bias in the measurements of one or more of the sensors of the inertial platform incorporated in the device. It may also be caused by an error in modeling the relation which links the measurements of the inertial platform to the directions of displacement and to the amplitude of this displacement. Finally, it may also be caused by an incorrect positioning of the device with respect to its direction of displacement.

The presence of a systematic bias such as this greatly degrades the precision of the estimation of the position of the device if it is not corrected. To correct such a bias, it is necessary to know its value. Now, in most cases, this value of the bias is not known in advance. Ideally, it would therefore be necessary to undertake a prior calibration phase to determine the value of the bias, and then use this value of the bias to correct the estimation of the position. However, obliging the user to execute a prior calibration phase before launching the location of the device is in most cases undesirable, or indeed quite simply impossible in certain cases such as for example when the bias evolves over time.

SUMMARY OF INVENTION

The invention is aimed at remedying this problem by proposing a method of location of the device which is more precise even in the presence of a bias in the direction of displacement or in the amplitude of the displacement of this device.

Its subject is therefore a method as claimed in claim 1.

By way of illustration, in the method hereinabove, first particles are associated with a first initial value for the corrective factor and second particles are associated with a second initial value for this same corrective factor. To understand the benefit of this method, it is assumed that the first initial value is close to the actual value of the bias to be corrected. Conversely, it is assumed that the second initial value is further from the actual value of the bias to be corrected. Thus, the values of the corrective factor which are associated with the first particles make it possible to compensate the bias more correctly and therefore to estimate the displacement of the device more precisely, on the basis of the same measurements. Under these conditions, as the iterations of steps c) to e) proceed, the position of the second particles is further and further from the real position of the device. Conversely, the position of the first particles remains close to the real position of the device. Consequently, it is very probable that a displacement of a second particle will rapidly infringe one or more of the predefined constraints on the displacements in the three-dimensional environment. Hence, as the iterations of steps c) to e) proceed, the weight of the second particles rapidly becomes less important than that of the first particles. The determination of the position of the device is then done, on the basis of a certain number of iterations of these steps c) to e), by giving more importance to the positions of the first particles than to the positions of the second particles. But, the positions of the first particles are obtained by compensating the bias more correctly. Thus, the device position estimated with the aid of the method hereinabove rapidly becomes more precise than if a method of location not correcting this bias were used. Moreover, this result is achieved with no prior calibration phase. Indeed, the value of the corrective factor which makes it possible to compute the displacement of a particle as precisely as possible is selected automatically as the iterations of steps c) to e) proceed and therefore at the same time as the position of the device is estimated.

The embodiments of this method of location can comprise one or more of the additional characteristics of the dependent claims.

These embodiments of the method of location furthermore exhibit the following advantages:

- applying the corrective factor to the measured variable corresponding to the amplitude of the displacement of the device makes it possible to automatically correct a bias in the amplitude of the displacement of this device;
- applying the corrective factor to a measured variable corresponding to the direction of the displacement of the device makes it possible to automatically correct a bias in the direction of displacement;
- during the step of generating new particles, associating these new particles with initial values for the corrective factor which are close to the corrective factor's current values associated with the particles which have not been eliminated makes it possible to increase the precision of the estimation of the value of the corrective factor and therefore of the position of the device as the iterations of steps c) to e) proceed;
- using, in the guise of predefined constraints, the existence of obstacles which are impassable to the device in the three-dimensional environment makes it possible to accelerate the convergence of the method of location toward a precise estimation of the position of the device;
- dividing the map into several zones and associating with each of these zones a list of identifiers of the impassable obstacles contained inside this zone makes it possible to retain a simple tiling of the map into several zones while being capable of using impassable obstacles situated entirely inside these zones;
- dividing the map into several zones and associating with each of these zones the displacement law which makes it possible to estimate with more precision the displacement of the device in this zone than if another displacement law associated with another zone were used makes it possible to increase the precision of the estimation of the position of the device;
- using a favored direction of displacement in a zone of the map to increase or on the contrary decrease the weight associated with a particle makes it possible to converge more rapidly toward a precise estimation of the position of the device.

The subject of the invention is also an information recording medium comprising instructions for the execution of the above method of location, when these instructions are executed by an electronic computer.

The subject of the invention is also an electronic locating unit.

Finally, the subject of the invention is also a device directly transportable by a pedestrian who is moving in displacement inside a three-dimensional space, this device comprising:

- an inertial platform able to measure physical quantities representative of the direction of displacement of this device and of the amplitude of this displacement, and
- the electronic locating unit hereinabove.

The invention will be better understood on reading the description which follows, given solely by way of nonlimiting example and while referring to the drawings.

BRIEF DESCRIPTION OF THE DRAWINGS

FIG. 1 is a vertical sectional schematic illustration of a building inside which is implemented a method of location of a device;

FIG. 2 is a schematic illustration of a location device;

FIG. 3 is a schematic illustration of a map used to locate the device of FIG. 2 in the building of FIG. 1;

FIG. 4 is a flowchart of a method of location implemented by the device of FIG. 2.

DETAILED DESCRIPTION

In these figures, the same references are used to designate the same elements. Hereinafter in this description, the characteristics and functions that are well known to the person skilled in the art are not described in detail.

FIG. 1 represents an assembly comprising a building 2, inside which a pedestrian 4 can move freely by walking. The building 2 is divided into several stories. Here, only a ground floor story 6 and a first story 8 are represented. The stories are linked together by zones of change of story such as a staircase or an elevator. Each story comprises rooms and corridors delimited by impassable walls which the pedestrian 4 cannot cross. The pedestrian 4 can enter a room only by passing through a door. Here, the interior of a room can also comprise obstacles which are impassable to the pedestrian 4 such as, for example, pillars or other construction elements of the building 2.

To aid the pedestrian 4 to locate themself inside the building 2, the latter transports a location device 10 directly in their hand. The device 10 is capable of locating itself on a map of the building 2 without recourse to sensors other than those which it comprises internally. In particular, the device 10 can chart its position inside the building 2 without using a navigation system calling upon external charting beacons implanted in the environment of the building 2. These external beacons can be satellites or radio wave emitters fixed to the building 2. In particular, the device 10 can chart its position without using a GPS system ("Global Positioning System").

FIG. 2 represents the device 10 in greater detail. The device 10 comprises an electronic locating unit 11. This unit 11 comprises a memory 12 as well as a programmable electronic computer 14 capable of executing instructions recorded in the memory 12. For this purpose, the memory 12 comprises the instructions necessary for executing the method of FIG. 4. Moreover, the memory 12 comprises a map 16 of the building 2. This map is described in greater detail with reference to FIG. 3.

The device 12 also comprises an inertial platform 17. The inertial platform 17 transmits to the computer 14, by way of an information transmission bus 19, measurements of the direction in which the device 10 is moving and of the amplitude of the displacement in this direction from the latest logged position of this device 10. For this purpose, for example, the inertial platform 17 comprises a three-axis accelerometer 18, a gyrometer 19 and a three-axis magnetometer 20. Here, the inertial platform 17 also comprises a barometer 21 for measuring the altitude of the device 10.

The device 10 is equipped with a screen 24 making it possible to display a graphical representation 26 of the map 16 and, on this graphical representation, a point PA representing the current position of the device 4 inside the building 2. This point PA is therefore situated in the graphical representation 26 at the site of the map 16 corresponding to the current position of the device 10 and therefore of the pedestrian 4.

For example, the device 10 is a smartphone or an electronic tablet programmed to execute the method of FIG. 4.

FIG. 3 graphically represents the content of the map 16 for the story 8 of the building 2. What will now be described in respect of the story 8 of the building 2 applies to each story of this building and to the ground floor story 6.

The map 16 comprises several zones 30 to 35 whose juxtaposition covers the entire area of the story 8. These zones are parallel to the floor of the story and contained in one and the same plane called the "plane of the story". This plane of the story is typically horizontal.

The zones 30 to 35 are contiguous and do not overlap. However, to increase the readability of FIG. 3, the zones 30 to 35 are represented as overlapping but, in reality, this is not the case. Thus, here, each portion of the periphery of each zone is common with at most one portion of the periphery of another different zone.

Conventionally, the edges of each zone are situated at the site of an obstacle which is impassable to the pedestrian 4 such as a wall. However, here, one and the same zone can encompass several rooms of the building 2. This is for example the case for the zone 33 which surrounds a room 40 and another smaller room 42. In FIG. 3, the periphery of each room is delimited by walls represented by thin lines. Moreover, each room comprises at least one opening for accessing the interior of this room. In FIG. 3, the openings are situated between the wall ends marked by points. An opening is typically a door.

A zone can also encompass obstacles situated in the interior of a room which are impassable to the pedestrian 4. For example, an impassable obstacle is an interior partition or a pillar or any other element of the building 2 which the pedestrian 4 cannot cross. Such a zone is illustrated by the zone 31 which comprises two partitions 44 and 46 situated inside a room 48.

Here, each zone is a polygon. Hence, for each zone, the map 16 contains:

- an identifier of this zone, and
- the coordinates, in an XYZ frame, of the vertices of the polygon delimiting this zone.

The XYZ frame is an orthogonal frame in which the X and Y directions are horizontal and the Z direction is vertical. In this embodiment, each zone is rectangular. Thus, only the coordinates of the two diagonally opposite vertices of a zone are recorded in the map 16 so as to economize on memory.

For each zone, the map 16 also comprises:

- a list of identifiers of just the impassable obstacles situated inside this zone or on the periphery of this zone,
- an identifier of a law of displacement inside this zone, and
- optionally, a favored direction of displacement.

The position and the dimensions of each impassable object are here coded by a horizontal segment contained in the plane of the floor. Thus, each obstacle identifier is associated with a pair of points $E_{jd}$ and $E_{jf}$. The points $E_{jd}$ and $E_{jf}$ mark, respectively, the start and the end of the segment $[E_{jd}; E_{jf}]$, where j is the identifier of the impassable obstacle. The coordinates of the points $E_{jd}$ and $E_{jf}$, in the plane of the floor, are known and contained in the map 16. Hence, for example, the zone 31 comprises eight obstacle identifiers $IdO_1$ to $IdO_8$. The identifiers $IdO_1$ to $IdO_8$ correspond, respectively, to the segments $[E_a; E_b]$; $[E_b; E_c]$; $[E_c; E_d]$; $[E_d; E_f]$; $[E_f; E_g]$; $[E_h; E_i]$; $[E_j; E_R]$ and $[E_p; E_m]$. The position of the points $E_a$ to $E_m$ is represented in FIG. 3.

Each displacement law makes it possible to compute, on the basis of the measurements of the inertial platform 17, at an instant $t_k$, the displacement of a particle $S^1$ from a previous position $P^i_{k-1}$ up to a new position $P^i_k$. This displacement is directly correlated with that of the device 10. Typically, this displacement between the positions $P^i_{k-1}$ and $P^i_k$ is identical or very close to that of the device 10 between the instants $t_{k-1}$ and $t_k$. Subsequently, the superscript "i" is the identifier of the particle and the subscript "k" is the order number of the instant at which the direction and the amplitude of the displacement of the device 10 are measured.

The inertial platform 17 measures the angle $\theta_k$, in the plane of the story, between the direction of displacement of the device 10 and the X direction. For this purpose, it is possible to use the measurements of the gyrometer 19 and of the magnetometer 20. Subsequently, the direction measured at the instant $t_k$ is called "direction $\theta_k$".

The inertial platform 17 is also capable of providing a physical quantity representative of the amplitude $I_k$ of the displacement of the device 10 in the direction $\theta_k$ between the instants $t_{k-1}$ and $t_k$. For this purpose, it is possible to integrate the measurement of the accelerometer 18 between the instants $t_{k-1}$ and $t_k$ and, if the measurement is zero, retain the previous measured speed $v_{k-1}$. However, in the case of a pedestrian who is walking on a horizontal floor, to obtain a more precise estimation of the amplitude $l_k$, the computer 14 detects on the basis of the measurements of the accelerometer 18 the instant at which a foot of the pedestrian 4 comes into contact with the floor. On the basis of these successive instants, the computer 14 computes a frequency $f_k$ of the footsteps of the pedestrian 4. Next, the amplitude $I_k$ of the displacement of the pedestrian 4 in the direction $\theta_k$ is computed by using the following footstep model: $I_k = Af_k + BT + C$, where A, B, C and T are constant coefficients independent of the measurements of the inertial platform 17.

Moreover, the coefficients A, B and C are coefficients which are independent of the morphological characteristics of the pedestrian. On the other hand, the coefficient T must be chosen equal to the height of the pedestrian 4. By default, the coefficient T is taken equal to the mean height of a human being, for example 1.78 m. The speed $v_k$ of displacement of the device 10 between the instants $t_{k-1}$ and $t_k$ is obtained with the aid of the following relation: $v_k = I_k/\Delta t$, where $\Delta t$ is the duration of the time interval between $t_{k-1}$ and $t_k$. Typically, $\Delta t$ is chosen equal to the duration of a footstep of the pedestrian 4.

Thus, when the pedestrian 4 moves by walking on the floor of the story 8, a displacement law is given by the following relations:

$$x^i_k = x^1_{k-1} + v_k \times \Delta t \times \cos\theta_k;$$

$$y^i_k = y^i_{k-1} + v_k \times \Delta t \times \sin\theta_k,$$

where $(x^i_k, y^i_k)$ and $(x^i_{k-1}, y^i_{k-1})$ are the coordinates, in the plane of the floor, of the positions $P^i_k$ and $P^i_{k-1}$ of the particle $S^i$.

In the case of a method of location of the device 10 implementing a particle filter, it is beneficial to explore the largest possible number of trajectories with the particles. Thus, conventionally, the displacement of each particle is disturbed in a random manner. For example, accordingly, the usable displacement law is the following:

$$x^i_k = x^i_{k-1} + v_k \times \Delta t \times \cos\theta_k + \mu^i_x;$$

$$y^i_k = y^i_{k-1} + v_k \times \Delta t \times \sin\theta_k + \mu^i_y;$$

where $\mu^i_k$ $\mu^i_y$ are random variables.

At each instant $t_k$ and for each particle $S^i$, the values of these variables $\mu^i_x$ and $\mu^i_y$ are randomly drawn as a function of a predefined centered probability law, that is to say characterized by a zero mathematical expectation. Thus, the mean of the values of each random variable $\mu^i_x$ and $\mu^i_y$ at the various successive instants $t_k$ tends to zero as k increases. For example, this predefined probability law is the same for the random variables $\mu^i_x$ and $\mu^i_y$ and for all the particles $S^i$. Subsequently, it is denoted $Lp_{xy}$. This law $Lp_{xy}$ is characterized by a predetermined standard deviation $\sigma_{xy}$. Here, the standard deviation $a_{xy}$ is constant and independent of the measurements of the inertial platform 17 for an updating at each footstep. For example, the standard deviation $\sigma_{xy}$ is greater than 5 cm or 10 cm and, preferably, less than 35 cm. For example, the law $Lp_{xy}$ is a uniform distribution or a Gaussian distribution.

In reality, there may also exist a measurement bias, called the direction bias, in the measurement of the direction $\theta_k$. Such a direction bias may originate from a defect in the sensors of the inertial platform 17. This direction bias may also be caused by the fact that the pedestrian 4 rotates the device 10 in a horizontal plane. In a similar manner, there may also exist a measurement bias, called here the footstep bias, in the measurement of the amplitude $l_k$ of the displacement of the device 10. This footstep bias may originate from a defect of the sensors of the inertial platform. In the example described here, it may also originate from a modeling error and more precisely from an error with respect to the default value of the coefficient T in the footstep model. Indeed, the actual height of the pedestrian 4 is unknown. Thus, if the pedestrian 4 is much shorter or much taller than 1.78 m, this introduces a systematic footstep bias in the measurement of the amplitude $I_k$. Typically, these biases are constant at least over a time interval that is long enough to be able to estimate them and correct them as described subsequently.

Here, to compensate and correct these direction and footstep biases, the displacement law used integrates corrective factors, respectively $\sigma^i$ and $\varepsilon^i$, associated with each particle $S^i$. For example, the displacement law is given by the following relations:

$$x^i_k = x^i_{k-1} + v_k \times \Delta t \times (1+\varepsilon^i_k) \times \cos(\theta_k + \alpha^i_k) + \mu^i_x;$$

$$y^i_k = y^i_{k-1} + v_k \times \Delta t \times (1+\varepsilon^i_k) \times \sin(\theta_k + \alpha^i_k) + \mu^i_y;$$

$$\varepsilon^i_k = \varepsilon^i_{k-1} + \mu^i_\varepsilon;$$

$$\alpha^i_k = \alpha^i_{k-1} + \mu^i_\alpha;$$

where:

$\varepsilon^i_k$ and $\varepsilon^i_{k-1}$ are the values, respectively at the instants $t_k$ and $t_{k-1}$, of the corrective factor $\varepsilon^i$ used to correct the footstep bias, and $\alpha^i_k$ and $\alpha^i_{k-1}$ are the values, respectively at the instants $t_k$ and $t_{k-1}$, of the corrective factor $\alpha^i$ used to correct the direction bias, $\mu^i_\varepsilon$ and $\mu^i_\alpha$ are random variables.

The random variables $\mu^i_\varepsilon$ and $\mu^i_\alpha$ are used for the same reasons and in the same manner as the variables $\mu^i_x$ and $\mu^i_y$ introduced previously. Thus, a new value of the variables $\mu^i_\varepsilon$ and $\mu^i_\alpha$ is randomly drawn at each new instant $t_k$ and for each particle $S^i$ as a function, respectively, of a predefined probability law $Lp_\varepsilon$ and of a predefined probability law $Lp_\alpha$. Typically, these laws $Lp_\varepsilon$ and $Lp_\alpha$ are the same for all the particles $S^i$. Here, the mathematical expectations of the laws $Lp_\varepsilon$ and $Lp_\alpha$ are equal to zero. Consequently, just as for the random variables $\mu^i_x$ and $\mu^i_y$, the mean of the values of each random variable $\mu^i_\varepsilon$ and $\mu^i_\alpha$ at the various successive instants $t_k$ tends to zero as k increases.

Moreover, the function of the variables $\mu^i_\varepsilon$ and $\mu^i_\alpha$ is only to slightly disturb the previous values $\varepsilon^i_{k-1}$ and $\alpha^i_{k-1}$ of the corrective factors $\varepsilon^i$ and $\alpha^i$ so that the values of the corrective factors $\varepsilon^i$ and $\alpha^i$ remain stable over time. For this purpose, the standard deviations $\sigma_\varepsilon$ and $\sigma_\alpha$, respectively, of the laws $Lp_\varepsilon$ and $Lp_\alpha$ do not allow a fast variation of the values of the corrective factors $\varepsilon^i$ and $\alpha^i$. Here, for this purpose, the standard deviation $\sigma_\varepsilon$ is chosen sufficiently small for the ratio $\Sigma\sigma_{\varepsilon k}/T$ to be less than 10%/s and, preferably, less than 5%/s or 1%/s, where:

$\sigma_{\varepsilon k}$ is the standard deviation of the law Lp, during the k-th iteration of step 96, $\Sigma\sigma_{\varepsilon k}$ is the sum of the standard deviations $\sigma_{\varepsilon k}$ between the q-th iteration and the p-th iteration of step 96, where q is an integer strictly less than p, T is the duration in seconds of the time interval which has elapsed between the q-th and the p-th iteration of step 96.

Step 96 is the step during which the coordinates of the particle $S^i$ are updated. This step is described in greater detail with reference to FIG. 4. Here, the standard deviation a, is constant. Thus, the previous ratio can also be written: $(p-q)\sigma_\varepsilon/T$. In this case, whatever p and q, the ratio is constant. The difference p−q is generally large enough to cover a time period of greater than 1 s or 4 s and, generally, less than 10 min or 5 min or 1 min. For example, this difference between p and q is constant whatever p.

In a similar manner, the standard deviation $\sigma_\alpha$ is chosen sufficiently small for the ratio $\Sigma\sigma_{\alpha k}/T$ to be less than 10°/s and, preferably, less than 5°/s or 1°/s, where:

$\sigma_{\alpha k}$ is the standard deviation of the law $Lp_a$ during the k-th iteration of step 96, $\Sigma\sigma_{\alpha k}$ is the sum of the standard deviations $\sigma_{\alpha k}$ between the q-th iteration and the p-th iteration of step 96, where q is an integer strictly less than p, T is the duration in seconds of the time interval which has elapsed between the q-th and the p-th iteration of step 96.

Here, the standard deviation $a_a$ is also constant. Thus, the previous ratio can also be written: $(p-q)\sigma_\alpha/T$.

Just as for the variables $\mu^i_x$ and $\mu^i_y$, the variables $\mu^i_\varepsilon$ and $\mu^i_\alpha$ make it possible to explore a large number of possible values for the corrective factors $\varepsilon^i$ and $\alpha^i$.

The displacement law described hereinabove is subsequently called the first displacement law. This first displacement law operates in most situations where the pedestrian 4 walks on a horizontal ground. On the other hand, in certain particular cases, there exist other more precise displacement laws. For example, the zone 35 is a stairwell comprising a staircase 50. In this zone 35, the length of the footsteps of the pedestrian 4 is imposed by the depth $L_{ri}$, of the stairs of this staircase 50. Thus, in the zone 35, it is preferable to use a second displacement law. Here, this second displacement law is identical to the first displacement law except that the product $v^i_k \times \Delta t \times (1+\varepsilon^i_k)$ is replaced with the measured variable $n^i_k$. The variable $n^i_k$ is given by the following relation: $n^i_k = (\text{Ent}(|z^i_k - z^i_{k-1}|/H_m)) \times L_m$, where:

$z^i_{k-1}$ and $z^i_k$ are the heights of the device 10 measured by the inertial platform 17 at the instants $t_{k-1}$ and $t_k$, respectively, $H_m$ is the constant height of a stair of the staircase 50, is the depth of a stair of the staircase 50, $|z^i_k - z^i_{k-1}|$ is the function which returns the absolute value of the difference between $Z^i_k$ and $z^i_{k-1}$, and Ent ( . . . ) is the function which returns the integer part of $|z^i_k - z^i_{k-1}|/H_m$.

Here, it is assumed that the height $H_m$ and the depth $L_m$ are known in advance and recorded in the map 16.

The values of the measured variables $z_k$ and $z_{k-1}$ are obtained, typically, on the basis of the measurements of the barometer 21. Here, only the zone 35 is associated with this second displacement law. All the other zones of the story 8 are associated with the first displacement law.

Inside the building 2, there exist zones such as the zones 30, 31, 33 and 34 in which the pedestrian 4 can move freely in all directions. Stated otherwise, in these zones, it is considered that all the directions of displacement are equiprobable. In this case, these zones are devoid of favored direction of displacement. Conversely, there exist zones of the building 2 where not all the directions of displacement are equiprobable. For example, the zone 32 is a long corridor parallel to the X direction. In this zone 32, the most probable directions of displacement for a pedestrian are parallel to the X direction. Indeed, it is less probable for the pedestrian 4 to move transversely to the longitudinal direction of the corridor. In this case, there is said to be a favored direction of displacement in this zone 32. Here, each favored direction is coded by an angle $\gamma$, in the plane of the floor, between this favored direction and the X direction. Moreover, in this embodiment, an angular tolerance $\sigma_\gamma$ is also associated with each favored direction. This angular tolerance is generally expressed in degrees or in radians. For example, in the case of the zone 32, the angle $\gamma=0°$ and the angular tolerance $\sigma_\gamma=\pm 30°$. In the embodiment described here, the zone 35 is also associated with a favored direction for ascending and descending the staircase 50. For this favored direction, the angle $\gamma=90°$ and the angular tolerance $\sigma_\gamma$ is equal to $\pm 20°$.

The manner of operation of the device 10 will now be described with reference to the method of FIG. 4.

To locate the position of the device 10 inside the building 2, the unit 11 implements a location algorithm known by the term "particle filter". The manner of operation of a particle filter is well known. For example, the reader can refer to the prior art cited in the introduction of this patent application and, in particular, to Straub 2010. Thus, subsequently, only the new specifics of implementation of this algorithm are described in detail. In particular, the management of the changes of stories is carried out, for example, as described in Straub 2010.

The method starts with a step 90 when location of the device 10 is triggered. For example, location is triggered manually by the pedestrian 4 by interacting with the man-machine interface of the device 10. The computer 14 then generates an initial assembly of $N_0$ particles $S^i$, where i is an identifier of the particle making it possible to distinguish it from among the set of other particles generated. The number $N_0$ of particles $S^i$ depends in particular on the initial knowledge that one has about the position of the device 10 in the building 2 and the area of this building. Typically, $N_0$ is greater than 10 or 100. $N_0$ is also generally less than 5000 or 1000. Each particle $S^i$ is initially associated:

with an initial position $P^i_0$ inside the building 2, this position $P^i_0$ comprising the coordinates $x^i_0$, $y^i_0$ and $z^i_0$ of the particle $S^i$ in the XYZ frame, with an initial value $w^i_0$ of the weight $w^i$ representing the probability that the device 10 is situated at the site of this particle $S^i$ at the instant $t_0$, with an initial value $\alpha^i_0$ for the corrective factor $\alpha^i$, and with an initial value $\varepsilon^i_0$ for the corrective factor $\varepsilon^i$.

During step 90, the initial position $P^i_0$ and the initial values $w^i_0$, $\alpha^i_0$ and $\varepsilon^i_0$ are initialized. Numerous schemes for initializing the positions $P^i_0$ and the values $w^i_0$ of each particle are known. For example, if the initial position of the device 10 is known to within plus or minus 1 m, the values $P^i_0$ of all the particles $S^i$ are drawn at random inside a circle centered on the known position and of radius equal to 1 m. It is also possible to take each value $w^i_0$ equal to $1/N_0$, where $N_0$ is the initial number of particles generated.

Each value $\alpha^i_0$ is drawn at random in such a way that the distribution of the initial values $\alpha^i_0$ follows a predetermined probability law $Lp_{\alpha 0}$ such as a uniform or Gaussian or other distribution. The law $Lp_{\alpha 0}$ is generally not the same as the law $Lp_\alpha$ which is used to obtain the values of the random variable $\mu^i_\alpha$. It is the a priori knowledge that one has about the distribution of the direction bias which makes it possible to choose the probability law for the initial values $\alpha^i_0$ which most resembles the one observed in reality. For example, it is also this a priori knowledge about the distribution of the direction biases which makes it possible to fix the value of the standard deviation $\sigma_{\alpha 0}$ of the law $Lp_{\alpha 0}$. For example, the standard deviation $\sigma_{\alpha 0}$ is chosen equal to 360° if one has no information about the direction bias. In another example, the standard deviation $\sigma_{\alpha 0}$ is chosen less than 45° if one has a little information about the direction bias. In contradistinction to the case of the previous random variables, this probability law $Lp_{\alpha 0}$ does not necessarily have a zero mean.

Each initial value $\varepsilon^i_0$ is chosen as described previously for the initial values $\alpha^i_0$ except that a predefined probability law $Lp_{\varepsilon 0}$ is used for the footstep bias, instead of the law $Lp_{\alpha 0}$. Moreover, the probability law $Lp_{\varepsilon 0}$ is not necessarily identical to the law $Lp_{\alpha 0}$. Indeed, generally, the direction bias and footstep bias are not correlated. Typically, the standard deviation $\sigma_{\varepsilon 0}$ of the law $Lp_{\varepsilon 0}$ is equal 30% to within plus or minus 5% if one has no information about the footstep bias. In another example, the standard deviation $\sigma_{\varepsilon 0}$ is chosen less than 20% if one has a little information about the footstep bias.

Thereafter, during a step 92, the inertial platform 17 transmits its measurements to the computer 14 which receives them. On the basis of these measurements, the computer 14 computes the speed $v_k$ and the angle $\theta_k$ of the current displacement of the device 10 from its latest position. Here, new measurements of the speed $v_k$ and of the angle $\theta_k$ are computed each time that the computer detects that a foot of the pedestrian has just touched the floor.

During a step 94, the computer 14 identifies, for each particle $S^i$, the zone inside which it is currently situated. Accordingly, for each particle $S^i$, the computer compares the latest known position $P^i_{k-1}$ of this particle with the periphery of each zone of the map 16. For example, in the case of rectangular zones aligned with the XYZ frame, the computer 14 tests whether the following two inequalities are satisfied: $x_{Aj} \le x^i_{k-1} \le x_{BJ}$ and $y_{AJ} \le y^i_{k-1} \le y_{Bj}$, where:

- the subscript j is an identifier of the zone of the map 16 making it possible to distinguish it from the other zones,
- $x_{Aj}$ and $y_{Aj}$ are the coordinates of that vertex of zone j which is closest to the origin of the XYZ frame, and
- $x_{Bj}$ and $y_{Bj}$ are the coordinates of that vertex of zone j which is furthest from the origin of the XYZ frame.

If these two inequalities are satisfied, then the particle $S^i$ belongs to zone j. Preferably, the computer 14 tests firstly whether the particle $S^i$ belongs to the same zone as that to which it belonged previously. If a particle $S^i$ does not belong to any zone, then a particular processing is triggered. For example, this particle is eliminated.

During a step 96, once the zone to which each particle $S^i$ belongs has been identified, each particle is displaced in a manner correlated with the measured displacement of the device 10 from its previous position $P^i_{k-1}$ up to a new position $P^i_k$. Accordingly, the coordinates of each particle $S^i$ are updated as a function:

- of the latest measurements received from the inertial platform 17,
- of the coordinates of the previous position $P^i_{k-1}$ of this particle, and
- of the displacement law associated with the zone inside which the particle $S^i$ is situated.

The displacement law to be used is therefore that associated with the zone identified during step 94.

For example, if the particle $S^i$ is situated inside one of the zones 30 to 34, then the coordinates of the new position $P^i_k$ are established using the first displacement law. On the other hand, if the particle $S^i$ is situated inside the zone 35, then the coordinates of the new position $P^i_k$ are established using the second displacement law.

At each new execution of step 96, the new values for the variables $\mu^i_x$, $\mu^i_y$, $\mu^i_\alpha$ and $\mu^i_\varepsilon$ are randomly drawn with the aid of the laws $Lp_{xy}$, $Lp_\alpha$, and $Lp_\varepsilon$, respectively.

During a step 98, the computer 14 updates the weights $w^i$ of each particle $S^i$. More precisely, the computer 14 decreases the weight $w^i$ of the particle $S^i$ if its latest displacement from the position $P^i_{k-1}$ to the position $P^i_k$ has infringed predefined constraints associated with the zone inside which it is situated.

Typically, for each particle $S^i$, the computer here verifies the following onstraints:

- constraint 1): the segment $[P^i_{k-1}; P^i_k]$ must not cross an impassable obstacle of the zone inside which this particle $S^i$ is situated;
- constraint 2): the direction of the displacement from the position $P^i_{k-1}$ to the position $P^i_k$ complies with the favored direction of displacement associated with the zone inside which the particle $S^i$ is situated.

Generally, here a constraint on the displacement of the particle $S^i$ is defined as being a condition which, if it is satisfied by the particle $S^i$, is used to increase the weight $w^i$ of this particle $S^i$ with respect to the weight of the particles which do not satisfy this condition. Conversely, if this condition is not satisfied by the particle $S_i$, then it is used to decrease the weight $w^i$ of this particle $S^i$ with respect to the weights of the particles which satisfy this condition.

To evaluate the constraint 1), for each particle $S^i$, the computer 14 searches for whether there exists an intersection between the segment $[P^i_{k-1}; P^i_k]$ and each impassable obstacle of the zone inside which the particle is situated. This zone was identified during step 94. This intersection search is carried out solely with the impassable obstacles whose identifiers are contained in the list associated with the identified zone. Here, since each obstacle is coded by a segment, this intersection search amounts to searching for an intersection between two segments.

If an intersection exists, then a very low or zero value is assigned to the weight $w^i$. A very low value is a value less than 0.2 or 0.1 for example. In the converse case, the value of the weight $w^i$ remains unchanged.

If the zone inside which the particle $S^i$ is situated is not associated with a favored direction, then the constraint 2) is not used to update the weight $w^i$. In the converse case, the constraint 2) is used. To evaluate the constraint 2), the computer 14 computes a weight $w^i_\theta$ on the basis of the deviation between the direction measured $\theta_k$ for the displacement of the particle $S^i$ and the favored direction of the zone inside which it is situated. The value of the weight $w^i_\theta$ is all the larger the lower the angular deviation between the favored direction $\gamma$ and the direction of displacement from the position $P^i_{k-1}$ to $P^i_k$. Moreover, here, the value of the weight $w^i_\theta$ is established while taking account of the tolerance $\sigma_\gamma$ associated with this favored direction. The value of the weight $w^i_\theta$ is therefore larger if the angular deviation between the direction of displacement of the particle $S^i$ and the favored direction lies in the tolerance margin defined by the value of $\sigma_\gamma$ and, in the converse case, the value of the weight $w^i_\sigma$ is smaller.

For example, here, the value of the weight $w^i_\sigma$ is computed with the following relation: $w^i_\sigma = p \times \exp[(\theta_k + \alpha^i_k - \gamma)^2 / (2\sigma_\gamma^2)]$, where p is a predefined constant coefficient. It will be noted that the value $\alpha^i_k$ of the corrective factor $\alpha^i$ of the direction bias is also used to compute this weight $w^i_\sigma$.

Thereafter, the value of the weight $w^i$ is taken equal to its previous value multiplied by the value of the weight $w^i_\theta$ thus obtained.

During a step 100, the computer 14 undertakes the normalization of the weights $w^i$ of all the particles $S^i$ so that the sum of all these weights is equal to one. For example, the computer 14 computes the sum W of all the weights $w^i$ and then divides each weight $w^i$ by the sum W.

During a step 102, the computer 14 re-samples the particles $S^i$. This re-sampling step consists in eliminating the particles whose weights $w^i$ have become too low to replace them with particles associated with parameters whose weights are higher.

Numerous re-sampling techniques are known. For example, here, we apply the SIR (Sequential Importance Resampling) scheme described in the following book: B. Ristic, S. Arulampalam, N. Gordon, "Beyond the Kalman Filter, particle filter for tracking applications", Artech House, 2004.

To summarize, this re-sampling scheme firstly consists in classing the particles into two groups: the particles to be regenerated, that is to say all the particles whose weight is below a predetermined threshold and the surviving particles, that is to say the other particles.

Thereafter, for each particle to be regenerated, the computer 14 eliminates the old particle and then generates a new particle to replace it. To generate a new particle, the computer 14 randomly draws a particle from the group of surviving particles. This chance drawing is carried out preferably in such a way that the probability of being drawn is proportional to the weight of the surviving particle.

Thereafter, the position $P^i_k$ and the values $\alpha^i_k$ and $\varepsilon^i_k$ of the drawn surviving particle are assigned to the new generated particle. During this step, preferably, the computer adds a random disturbance on the position and on the values of the corrective factors by using, for example, the random variables $\mu_x$, $\mu_y$, $\mu_\alpha$ and $\mu_\varepsilon$. However, these disturbances are calibrated in such a way that the values $\alpha^i_k$ and $\varepsilon^i_k$ assigned to the generated particle remain very close to the current values for the corrective factors associated with the surviving particle drawn. Typically, the mean of the values $\alpha^i_k$ which are assigned to the generated particles is closer to the mean of the values $\alpha^i_k$ of the surviving particles than to the mean of the values $\alpha^i_k$ of the eliminated particles. The same holds for the values $\varepsilon^i_k$ assigned to the generated particles.

A new weight is also assigned to each generated particle and, optionally, to the surviving particle from which it arises.

During a step 104, the computer 14 estimates the position PA of the device 10 on the basis of the positions $P^i_k$ and of the weights $w^i$ of all the particles $S^i$. Numerous schemes are possible for doing this. For example, the position PA is taken equal to that of the particle $S^i$ having the highest weight $w^i$. In another embodiment, the position PA is taken equal to the mean of the positions $P^i_k$ of the particles $S^i$ on weighting each position $P^i_k$ by the weight $w^i$. Another scheme is also described in application WO 2012158441.

Finally, during a step 106, a point is displayed at the position PA on the graphical representation 26 of the map 16 to indicate to the pedestrian 4 his position on this map and therefore his position inside the building 2.

Steps 92 to 106 are repeated in a loop. As these iterations proceed, the precision of the estimation of the position of the device 10 increases since only the most probable positions $P'_k$ are retained.

In parallel with step 104, during a step 108, the computer 14 computes an estimation $E_\alpha$ of the direction bias and an estimation $E_\varepsilon$ of the footstep bias on the basis, respectively, of the current values $\alpha^i_k$ and $\varepsilon^i_k$ of the particles $S^i$. For example, the estimation $E_\alpha$ is taken equal to the mean of the current values $\alpha^i_k$ of all the particles $S^i$. In a similar manner, the value of the estimation E, is taken equal to the mean of the current values $\varepsilon^i_k$ of all the particles $S^i$.

The precision of the estimations $E_\alpha$ and $E_\varepsilon$ increases as the repetitions of steps 92 to 106 proceed. Indeed, it is very probable that the particle $S^i$ associated with an incorrect current value for the corrective factor $\alpha^i$ or $\varepsilon^i$ will rapidly infringe the constraints evaluated during step 98. Hence, the particles $S^i$ associated with incorrect current values for the corrective factors are preferably eliminated during step 102. Thus, as the iterations of steps 92 to 106 proceed, the particles $S^i$ associated with correct current values for the corrective factors are preferably selected as surviving particles during step 102. Hence, the estimations $E_\alpha$ and $E_\varepsilon$ converge toward the actual values of the direction bias and the footstep bias.

Moreover, since the values of the corrective factors $\alpha^i$ and $\varepsilon^i$ converge toward the actual values of the direction and footstep biases as the iterations of steps 92 to 106 proceed, the corrective factors correct these direction and footstep biases more and more precisely. Hence, the presence of these corrective factors in the displacement law makes it possible to substantially increase the precision of the estimation of the position PA even in the presence of such direction and footstep biases.

The estimations $E_\varepsilon$ and $E_\alpha$ can be displayed on the screen 24 or used by other applications to correct the direction and footstep biases.

Numerous other embodiments are possible. For example, certain more sophisticated sensors provide a mean value of the variable measured at an instant k as well as a standard deviation in this measurement (see for example Straub 2010). In this case, the measured values of the angle $\theta_k$ and of the amplitude $I_k$ are obtained by drawing the values at random using a Gaussian probability law whose mean and standard deviation are equal to those transmitted by the sensors. This makes it possible in particular to take the measurement noise into account.

What was described previously in the particular case where it is a pedestrian who directly carries the device 10 may also be adapted to other situations. For example, the device 10 can be fixed on a trolley pushed by the pedestrian. In this case, the speed $v_k$ is obtained by integrating the acceleration measured by the trolley. Another solution consists in detecting the frequency of the impacts which occur each time a wheel of the trolley rolls over a join between two flagstones of a ground pavement. The method of location described also applies to the case where the device 10 is transported by a motorized robot which moves without the aid of the pedestrian 4. In this case, the amplitude of the displacement can be measured by measuring the number of wheel revolutions of a driving wheel of the robot.

The method described above applies to any type of three-dimensional space where the device 10 can be displaced. For example, it may also entail a space situated outdoors and outside any building. For example, this method is useful to locate a person in a place where location by GPS or on the basis of telephonic relay is impossible.

Other ways of coding the constraints on the displacement of the device 10 exist and are usable in the above method. For example, rather than recording the position of the walls, it is possible to record all the possible paths. If the displacement of a particle does not follow one of these possible paths, then its weight is decreased. Such an embodiment is described in greater detail in application WO 2012158441 and in application U.S. Pat. No. 8,548,738. Rather than recording the position of the walls, it is also possible to record the position of the doors. In the latter case, the weight of a particle is increased if the latter goes from one room to another by passing through a door. Such an embodiment is described in greater detail in Straub 2010.

Other predefined constraints can be used to update the value of the weight $w^i$. For example, if an approximate measurement of the position of the device 10 is available by using other information, then the weight $w^i$ is increased if the position $P^i_k$ is close to this approximate position and, on the contrary, decreased if the position $P^i_k$ is far from this approximate position. For example, the approximate position is obtained on the basis of the power of a radioelectric signal received by the device 10 and of the known position in the XYZ frame of the emitter of this radioelectric signal. For example, the emitter is a Wi-Fi terminal.

Although the constraint consisting in testing the collision of a particle with an impassable obstacle is, in practice, the one used most often, it is not absolutely necessary if there exist other predefined constraints such as those described above which can be used.

As a variant, step 100 of normalizing the weight $w^i$ of the particles $S^i$ is omitted.

During the re-sampling of the particles, numerous other algorithms for determining the initial position of the regenerated particles are known and may be used instead of that described above. For example, the KLD (Kullbak-Leibler-Divergence) algorithm can be used.

Likewise, other algorithms are possible for associating a new current value $\alpha^i_k$ and $\varepsilon^i_k$ with each regenerated particle. Each new value $\alpha^i_k$ is dependent on one or more of the values $\alpha^i_k$ associated with the particles which have not been eliminated and is independent of the values $\alpha^i_k$ associated with the particles which have been eliminated. The same holds for the new value $\varepsilon^i_k$.

In a simplified variant, the re-sampling step 102 is omitted. Even if the re-sampling is not undertaken, the method hereinabove makes it possible to increase the precision of the location of the position of the device 10 since the weight $w^i$ of each particle $S^i$ associated with an incorrect current value $\alpha^i_k$ or $\varepsilon^i_k$ decreases as the iterations of steps 92 to 104 proceed.

Other schemes for determining whether a particle is situated inside a zone are possible. For example, Straub 2010 describes an alternative scheme usable in the case of polygonal zones of more complicated shape than a simple rectangle.

Shapes of zones other than polygons are possible. For example, a zone can have the shape of a circle. In this case, the coordinates of its center and of its radius are recorded in the map 16. There is in reality no limitation on the shape of a zone as long as the coordinates of the periphery of this zone can be determined in the XYZ frame.

The above method has been described in the particular case where each zone is associated at one and the same time with impassable-obstacle identifiers, a displacement law and a favored direction. However, it may frequently happen that the displacement law is the same for several immediately contiguous zones. For example, here, this is the case for zones 30 to 34 which are all associated with the first displacement law. In this case, it may be more beneficial to record in the map 16 several stacked strata of zones for one and the same story. Each stratum comprises at least one zone and, typically, a set of several zones covering the entire area of the floor. The zones of one stratum are distinguished from the zones of another stratum by the type of property that it associates with this zone. For example, a first stratum comprises solely zones associated only with impassable-obstacle identifiers. A second stratum comprises solely zones associated only with a respective displacement law. Finally, a third stratum comprises only zones associated solely with a favored direction. When such a stack of strata is applied to the story 8, the zones of the first stratum are, for example, identical to the zones 30 to 35 except that they comprise only the identifiers of impassable obstacles. Here the second stratum is limited to two zones. One of them is identical to the zone 35 except that it is solely associated with the second displacement law. The other zone of this second stratum corresponds to the union of zones 30 to 34 and is solely associated with the first displacement law. Here the third stratum comprises four zones. The first and second zones are identical, respectively, to zones 32 and 35 except that they are solely associated with a respective favored direction. The third zone corresponds to the union of zones 30 and 31 and the fourth zone then corresponds to the union of zones 33 and 34 which are not associated with any favored direction.

The manner of operation of the method of location with a map comprising several strata is identical to that described above except that, for each particle $S^i$, the zone of each stratum inside which it is situated is identified. Thereafter, it is these zones inside which it is situated which make it possible to identify the displacement law to be used and the predefined constraints to be tested so as to update the value of its weight $w^i$. The use of several strata of zones may simplify the definition of these zones.

In another variant, one of these strata corresponds to an accessibility map such as described in Straub 2010 in chapter 5.1.2. However, preferably, the various contiguous boxes of the accessibility map of Straub 2010 that are associated with the same value of the degree $\lambda$ of accessibility are grouped together within one and the same zone.

Each zone can also be associated with additional predefined constraints for updating the weight $w^i$ of the particles situated in this zone. For example, it is possible to associate with each zone a coefficient $w_a$ of accessibility which represents the probability that a pedestrian enters this zone. Thereafter, when updating the weight $w^i$ of a particle $S^i$ situated in this zone, the weight $w^i$ is taken equal to its previous value multiplied by this coefficient $w_a$.

Other displacement laws are usable. For example, the standard deviations $\sigma_\alpha$ and $\sigma_\varepsilon$ are not necessarily constant. In this case, they are constant over long durations and then modified for a brief time interval before returning to their previous values. For example, solely during this brief time interval, the ratios $\Sigma\sigma_{\varepsilon k}/T$ and/or $\Sigma\sigma_{\alpha k}/T$ are permitted to exceed the previously defined thresholds. Typically, the temporary increasing of the values of the standard deviations $\sigma_\alpha$ and $\sigma_\varepsilon$ is used to reinitialize the current values $\alpha^i_k$ and $\varepsilon^i_k$. Generally, the values of the standard deviations $\sigma_\alpha$ and $\Sigma_\varepsilon$ are constant for more than 90% of the time of use of the device 10 so as to prevent, during this 90% of the time, a fast variation of the values of the corrective factors $\varepsilon^i$ and $\alpha^i$. It is possible to verify that the ratio $\Sigma\sigma_{\varepsilon k}/T$ is maintained below a predetermined threshold over at least 90% of the time of use, for example, by taking the difference p−q equal to a constant. Thereafter, the ratio $\Sigma\sigma_{\varepsilon k}/T$ is computed for each value of p corresponding to an iteration of step 96 occurring during this time of use. If at least 90% of the ratios thus computed are below the predetermined threshold, then this ratio is maintained below this predetermined threshold for more than 90% of the time of use. The same computation can be used for the ratio $\Sigma\sigma_{\alpha k}/T$. The time of use is for example a period of continuous use of the device 10 without stopping the execution of the method of FIG. 4.

In another variant, the expectation of one of the probability laws $Lp_\varepsilon$ or $Lp_\alpha$ is non-zero. This then introduces an additional bias which is added to the real bias. The current value $\varepsilon^i_k$ or $\alpha^i_k$ can also be computed on the basis of a previous value other than $\varepsilon^i_{k-1}$ or $\alpha^i_{k-1}$. For example, $\varepsilon^i_k$ is computed on the basis of the previous value $\varepsilon^i_{k-n}$, where n is a constant strictly greater than one. Thus, it is also possible to use the following relations to compute the current value of $\varepsilon^i_k$: $\varepsilon^i_k=(\varepsilon^i_{k-1}+\varepsilon^i_{k-2})/2+\mu^i_\varepsilon$ or $\varepsilon_k=\varepsilon^i_{k-2}+\mu^i_\varepsilon$. The same thing applies to the computation of the current value $\alpha^i_k$.

Moreover, if it is known that the direction bias is zero or negligible, then the first and the second displacement laws are simplified by eliminating the corrective factor $\alpha^i$. Conversely, if it is known that the footstep bias is zero or negligible, then the first displacement law is simplified by eliminating the corrective factor $\varepsilon^i$. The corrective factor remaining in the first displacement law is thereafter estimated as described above with reference to FIG. 4. Conversely, it is possible to add additional corrective factors to the first displacement law. For example, if the best possible value of the coefficient A in the footstep model of the first displacement law is not known precisely, it is then possible to use the following footstep model $I_k=\pi Af_k+BT+C$, where $\pi$ is an additional corrective factor. The value of the factor $\pi$ is then estimated in the same manner as was described for the corrective factors $\alpha^i$ and $\varepsilon^i$. It will be noted that in the case of the corrective factor Tr, the latter is a multiplicative factor and not a subtractive factor, that is to say that it multiplies the measured variable $f_k$.

Displacement laws other than those described above may be used. For example, a displacement law specifically adapted to the displacement on an escalator or on a moving walkway or in an elevator can readily be designed and associated with the zone comprising this escalator, this moving walkway or this elevator. Moreover, if there exists a measurement bias in these particular zones, then it is desirable to introduce a corrective factor into the displacement law to compensate this measurement bias. If, initially, the value of this corrective factor is not known, then this value is estimated in the same manner as was described for the corrective factors $\alpha'$ and $\varepsilon^i$.

Step 106 or 108 is not necessarily carried out after each iteration of steps 92 to 104. For example, these steps are carried out only one time out of two.

The previous embodiments have been described in the particular case where all the processings to determine the position PA are carried out by the computer 14 of the device 10. As a variant, these processings are distributed over several distinct computers. One of these distinct computers can be that of a computer server mechanically independent of the device 10. For example, the device 10 transmits the measurements to this server and this server determines the position PA and then returns the position PA determined to the device 10 which displays it on its screen 24. In this case, the map 16 is also recorded in the memory of this server.

The selection of a specific displacement law as a function of the zone in which the particle is situated can be implemented independently of the other characteristics of the method of FIG. 4. In particular, this selection of the displacement law can be implemented independently of the use of corrective factors such as the factors $\alpha^i$ and $\varepsilon^i$ and/or independently of the use, in the guise of predefined constraints, of the favored directions of displacement.

Likewise, the use of favored directions of displacement associated with zones can also be implemented independently of the other characteristics of the method of FIG. 4. In particular, the use, in the guise of predefined constraints, of the favored directions of displacement can be implemented independently of the use of corrective factors such as the factors $\alpha^i$ and $\varepsilon^i$ and/or independently of the selection of the displacement law as a function of the zone inside which the particle is situated.

The invention claimed is:

1. A method comprising locating a device that has been displaced inside a three-dimensional space, wherein said device comprises an inertial platform, an electronic locating-unit, and a bus, wherein said electronic locating-unit comprises a programmable electronic computer and a memory, wherein said programmable electronic computer is capable of executing instructions stored in said memory, wherein said inertial platform comprises sensors that are onboard said displaced device, wherein said sensors comprise an accelerometer, wherein said bus connects said inertial platform to said electronic locating-unit, wherein said electronic-locating unit is configured to detect, based at least in part on measurements provided by said accelerometer and provided to said electronic locating-unit by said bus, movement of said inertial platform, said movement being indicative of said displacement of said device, wherein said memory stores a map of said three-dimensional space and instructions for execution by said programmable electronic computer, wherein said method comprises executing a first step, executing a second step, repeating a sequence of steps, said sequence comprising a third step, a fourth step, and a fifth step, wherein said first step comprises providing said map of said three-dimensional space and of predefined constraints on displacements of said device in said three-dimensional space, wherein said second step comprises generating a number of distinct particles, said number depending on initial knowledge about a location of said device, wherein each of said distinct particles is associated with coordinates that code a position of said particle in said map and a weight that represents a probability that said device is situated at said position, wherein said third step comprises receiving measurements representative of a magnitude and direction of displacement of said device from a previous position thereof, said measurements having been carried out by said sensors onboard said displaced device, wherein said fourth step comprises executing a transformation of each particle, wherein executing a transformation comprises updating coordinates of positions of each particle as a function of said measurements received during said third step with the aid of a predetermined displacement law, said predetermined displacement law being a law for displacing said particle from a previous position to a new position in a manner that is correlated with said measured displacement of said device, each displacement law comprising a first measured-variable and a second measured-variable, said first measured-variable having a value that depends on said measurement of said direction of displacement received during said third step and said second measured-variable having a value that depends on said measurement of said amplitude of said displacement received during said third step, wherein said fifth step comprises, for each particle, if a latest displacement of said particle from said previous position to said new position satisfies said predefined constraints, increasing said weight associated with said particle relative to weights of said particles whose latest displacement fails to satisfy said predefined constraints, said weights comprising highest weights and lowest weights, wherein said fifth step comprises estimating said position of said device on said basis of said positions of said particles and of said weights associated with said particles, wherein estimating said position of said device comprises allotting more importance to positions of particles associated with said highest weights, wherein said displacement law comprises using an arithmetical operation to combine a corrective factor with one of said measured variables, said corrective factor being corrective of a bias, wherein each particle is associated with a current value of said corrective factor, said current value of said corrective factor being constructed at each iteration of said fourth step based on a previous current-value of said corrective factor that was computed during a previous iteration of said fourth step and to which is added a random variable drawn according to a predefined probability law, said current values of various particles having been initialized to corresponding initial values before said first execution of said fourth step, and wherein, during said fourth step, for each particle whose coordinates are updated with said aid of said displacement law, said value of said corrective factor in said displacement law is set equal to said current value of said corrective factor associated with said particle, after several iterations of said sequence of steps, re-sampling said particles, wherein resampling said particles comprises carrying out another transformation on said set of particles, wherein said another transformation comprises eliminating particles that are associated with said lowest weights, automatically generating new particles to replace said eliminated particles, and assigning a new current-value of said corrective factor to each new particle, each new value of said corrective factor being dependent on one or more of said corrective factor's current values associated with said particles that have not been eliminated and independent of said corrective factor's current values associated with said particles that have been eliminated.

2. The method of claim 1, wherein, in the displacement law, the corrective factor is added to or multiplied by the second measured variable, and the variation of the standard deviation $\sigma\varepsilon$ of the predefined probability law is maintained below 10% per second for more than 90% of the time of use of the method for locating the device, wherein the variation of the standard deviation, $\sigma\varepsilon$, is given by $\Sigma\sigma\varepsilon k/T$, wherein $\sigma\varepsilon k$ is the standard deviation of the predefined probability law during the $k^{th}$ iteration of the fourth step, wherein $\Sigma\sigma\varepsilon k$ is the sum of the standard deviations, $\sigma\varepsilon k$, between the $q^{th}$ iteration and the $p^{th}$ iteration of the fourth step, wherein q is an integer that is less than p, and wherein T is the duration, in seconds, of the time interval that has elapsed between the $q^{th}$ and the $p^{th}$ iteration of the fourth step.

3. The method of claim 1, wherein the corrective factor is, in the displacement law, added to or multiplied by the first measured variable and the variation of the standard deviation $\sigma\alpha$ of the predefined probability law is maintained below 10° per second for more than 90% of the time of use of the method for locating the device, wherein the variation of the standard deviation $\sigma\alpha$ is given by $\Sigma\sigma\alpha k/T$, wherein $\sigma\alpha k$ is the standard deviation of the predefined probability law during the $k^{th}$ iteration of the fourth step wherein $\Sigma\sigma\alpha k$ is the sum of the standard deviations $\sigma\alpha k$ between the $q^{th}$ iteration and the $p^{th}$ iteration of the fourth step, wherein q is an integer that is less than p, and wherein T is the duration in seconds of the time interval that has elapsed between the $q^{th}$ and the $p^{th}$ iteration of the fourth step.

4. The method of claim 1, wherein, during the first step, the predefined constraints comprise coordinates that code positions and dimensions of obstacles that are impassable to the device in the three-dimensional space, and wherein the fifth step comprises, for each particle searching for an intersection between a segment that is defined between the previous position and the new position of the particle and an impassable obstacle by using coordinates of the impassable obstacle, the coordinates having been provided during the first step, decreasing the weight associated with the particle if such an intersection exists and, in the converse case, neither increasing nor decreasing the weight associated with the particle.

5. The method of claim 4, wherein the map that was provided during the first step contains several distinct zones, wherein each distinct zone is associated with coordinates and a list of identifiers, wherein the coordinates delimit a periphery of the distinct zone, wherein the identifiers identity only those impassable objects that are inside the distinct zone, wherein the fifth step comprises, for each particle, identifying the distinct zone in which the particle is situated by comparing updated coordinate of the particle with peripheries of the distinct zones on the map, the coordinates of the peripheries having been provided during the first step, and having identified the distinct zone in which the particle is situated, searching only for an intersection between the segment and the impassable objects that are identified by the identifiers in the list of identifiers as being in the distinct zone.

6. The method of claim 1, wherein, the map provided during the first step includes distinct zones, wherein each distinct zone is associated with coordinates and a selected displacement law, the selected displacement law having been selected from a set of several different displacement laws, wherein the coordinates define a periphery of the distinct zone on the map, wherein the selected displacement law associated with the distinct zone is selected to be associated with the distinct zone because the selected displacement law estimates a value more precisely than other displacement laws in said set of displacement laws, wherein the value that the selected displacement law estimates more precisely is an estimate of an amplitude and direction of displacement of the device when the device is situated inside the distinct zone, wherein the estimate is based on measurements received during the third step, wherein the displacement laws in the set of displacement laws differ from one another by using different mathematical operations to estimate the coordinates of the particle based on the measurements received during the third step wherein the fourth step systematically comprises, for each particle, executing a first operation and a second operation, wherein the first operation comprises identifying the distinct zone in which the particle is situated by comparing coordinates of the particle with peripheries of the distinct zones on the map, said distinct zones having been identified by coordinates provided during the first step, and wherein the second operation comprises updating the coordinates of the particle using only the displacement law associated with the distinct zone identified in the first operation.

7. The method of claim 1, wherein the map provided during the first step contains a zone having a favored displacement-direction, coordinates that define the position of the periphery of the zone, and the favored displacement-direction of the zone, wherein the fifth step comprises, for each particle, detecting the presence of the particle in the zone by comparing the coordinates of the particle with the periphery of the zone as defined by the coordinates provided during the first step, if the particle is detected as being in the zone and if a displacement of the particle within the zone satisfies a condition, increasing the weight associated with the particle, wherein the displacement of the particle satisfies the condition if an angular deviation between the favored displacement-direction and the displacement of the particle between a previous position and a new position thereof is within a pre-selected tolerance of an angle selected from the group consisting of 0° and 180°, wherein increasing the weight comprises increasing the weight relative to other particles within the zone, wherein for each of the other particles, the displacement of that particle fails to satisfy the condition, and if the particle is detected as being outside the zone, prohibiting the use of the favored displacement-direction when updating the weight assigned to the particle.

8. The method of claim 1, wherein said inertial platform further comprises a barometer, a gyrometer, a magnetometer, wherein said magnetometer is a triaxial magnetometer, wherein said accelerometer is triaxial.

9. A manufacture comprising a non-transitory computer-readable medium having encoded thereon instructions that, when executed by said electronic computer, cause said electronic computer to execute the method recited in claim 1.

10. An apparatus for locating a device displaceable inside a three-dimensional space, the apparatus comprising a memory and a processor, wherein the memory contains a map of the three-dimensional space and predefined constraints on the displacements of the device in the three-dimensional space, and wherein the processor is configured to execute a first step, execute a second step, repeat a sequence of steps, the sequence comprising a third step, a fourth step, and a fifth step, wherein the first step comprises providing the map of the three-dimensional space and of predefined constraints on displacements of the device in the three-dimensional space, wherein the second step comprises generating distinct particles, each of the distinct particles being associated with coordinates that code a position of the particle in the map and with a weight that represents a probability that the device is situated at the position, wherein the third step comprises receiving measurements representative of a magnitude and direction of displacement of the device from a previous position thereof, the measurements having been carried out by sensors onboard the displaced device, wherein the fourth step comprises updating coordinates of positions of each particle as a function of the measurements received during the third step with the aid of a predetermined displacement law, the displacement law being a law for displacing the particle from a previous position to a new position in a manner that is correlated with the measured displacement of the device, each predetermined displacement law comprising a first measured-variable and a second measured-variable, the first measured-variable having a value that depends on the measurement of the direction of displacement received during the third step and the second measured-variable having a value that depends on the measurement of the amplitude of the displacement received during the third step, wherein the fifth step comprises, for each particle, if the latest displacement of the particle from the previous position to the new position satisfies the predefined constraints, increasing the weight associated with the particle relative to weights of the particles whose latest displacement fails to satisfy the predefined constraints, the weights comprising highest weights and lowest weights, wherein the fifth step comprises estimating the position of the device on the basis of the positions of the particles and of the weights associated with the particles, wherein estimating the position of the device comprises allotting more importance to positions of particles associated with the highest weights, wherein the displacement law comprises using an arithmetical operation to combine a corrective factor with one of the measured variables, the corrective factor being corrective of a bias, wherein each particle is associated with a current value of the corrective factor, the current value of the corrective factor being constructed at each iteration of the fourth step based on a previous current-value of the corrective factor that was computed during a previous iteration of the fourth step and to which is added a random variable drawn according to a predefined probability law, the current values of various particles having been initialized to corresponding initial values before the first execution of the fourth step, and wherein, during the fourth step, for each particle whose coordinates are updated with the aid of the displacement law, the value of the corrective factor in the displacement law is set equal to the current value of the corrective factor associated with the particle, after several iterations of said sequence of steps, re-sampling the particles, wherein resampling the particles comprises eliminating particles that are associated with the lowest weights, automatically generating new particles to replace the eliminated particles, and assigning a new current-value of the corrective factor to each new particle, each new value of the corrective factor being dependent on one or more of the corrective factor's current values associated with the particles that have not been eliminated and independent of the corrective factor's current values associated with the particles that have been eliminated.

11. The apparatus of claim 10, further comprising a portable electronic locating-unit that is directly transportable by a pedestrian who is moving through the three-dimensional space, the portable electronic locating-unit comprising an inertial platform that is configured to measure physical quantities representative of the amplitude and direction of displacement of the portable electronic locating-unit, wherein the portable electronic locating-unit comprises the memory and the processor.

* * * * *